Jan. 15, 1935.  J. L. FORD  1,988,003
METER SUPPORT
Filed Dec. 5, 1931   2 Sheets-Sheet 1
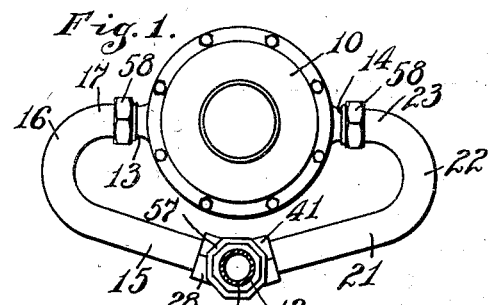
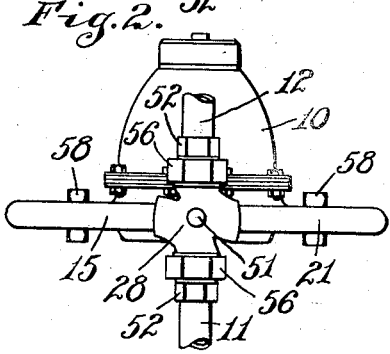
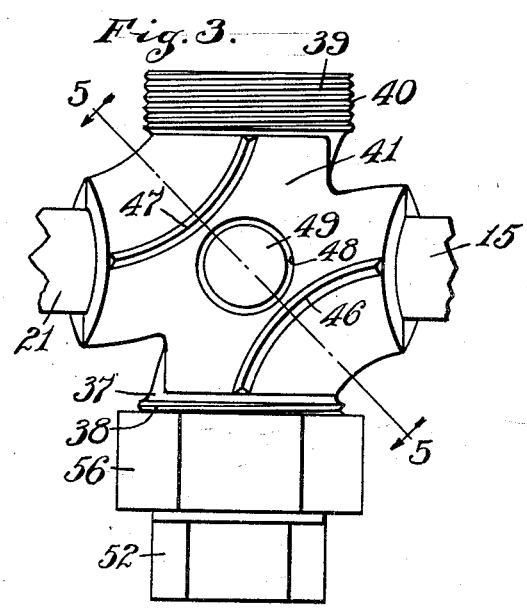
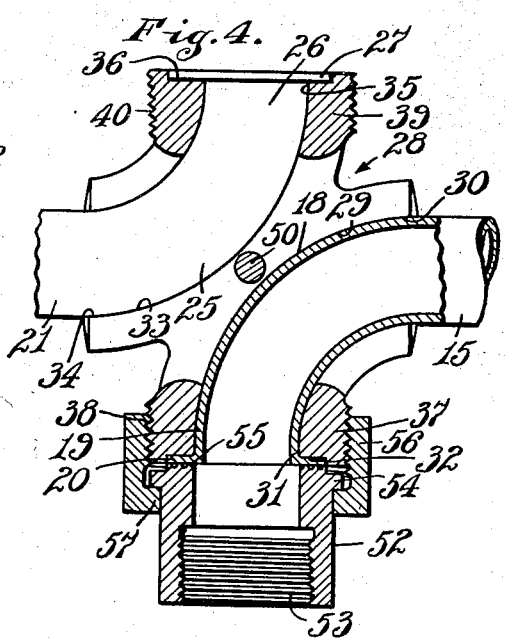
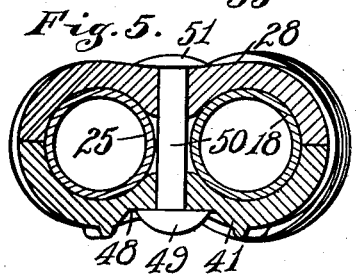
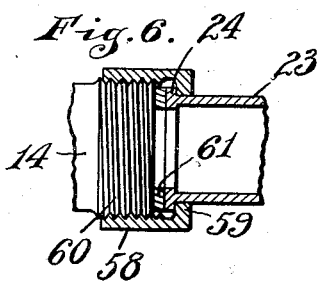
INVENTOR.
John L. Ford,
BY Hood + Hahn
ATTORNEYS Jan. 15, 1935.                J. L. FORD                 1,988,003
                             METER SUPPORT
                          Filed Dec. 5, 1931         2 Sheets-Sheet 2
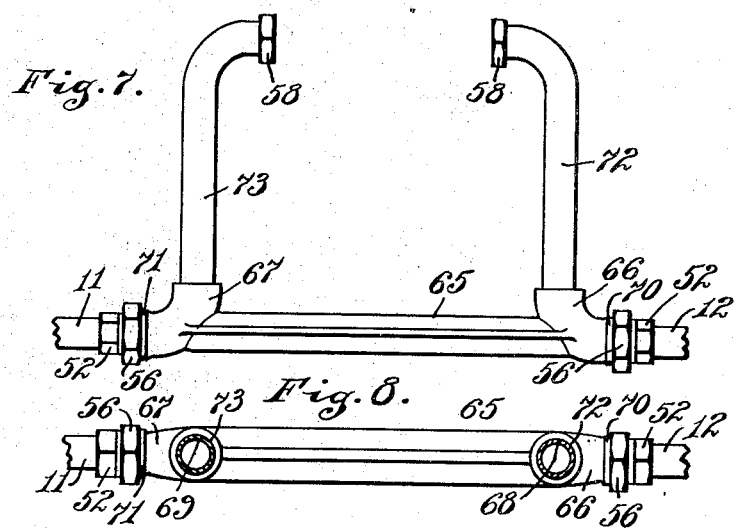
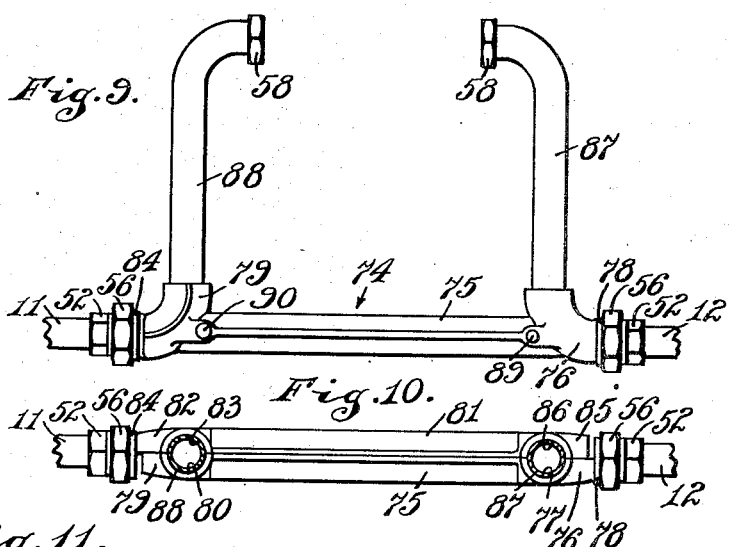
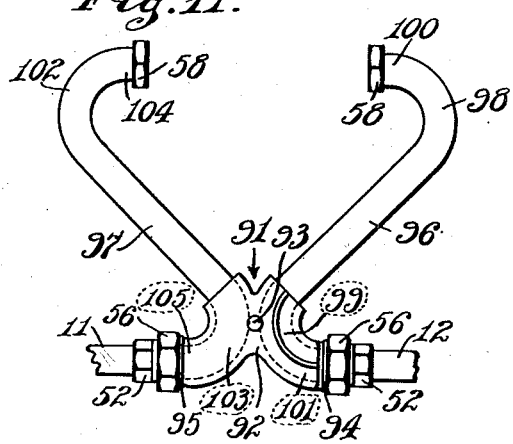
INVENTOR.
John L. Ford,
BY
Hood + Hahn.
ATTORNEYS Patented Jan. 15, 1935

1,988,003

UNITED STATES PATENT OFFICE 1,988,003

METER SUPPORT

John L. Ford, Wabash, Ind., assignor to Ford Meter Box Company, Wabash, Ind., a corporation of Indiana Application December 5, 1931, Serial No. 579,186

15 Claims. (Cl. 285—3)

The present application relates to meter supports, and more particularly to units having the double function of supporting meters to which they are connected and connecting said meters in the supply lines. A primary object of the invention is to provide means of the character described which shall be very simple to install; and which shall be of such character that, once it has been installed, the meter supported thereby may be removed or replaced with a minimum expenditure of time and effort, and with a minimum probability of damage to the meter or to the supply line. Further objects of the invention will appear as the description proceeds.

Although the unit of the present invention has been illustrated and will be described as a support-connector for a meter, it is to be understood that the unit is not limited to that application, but may be used wherever and whenever it is desired to connect a fixture having ports therein between a pair of pipe ends.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 1 is a plan of a unit constructed in accordance with the present invention and supporting a meter;

Fig. 2 is a side elevation thereof;

Fig. 3 is a broken elevation of a portion of the unit looking in a direction opposite that at which Fig. 2 is taken;

Fig. 4 is a view similar to Fig. 3 with one plate of the clamp removed, and parts of the organization being shown in section;

Fig. 5 is a section taken substantially on the line 5—5 of Fig. 3 and looking in the direction of the arrows;

Fig. 6 is an enlarged section of a detail;

Fig. 7 is a side elevation of a second embodiment of my invention;

Fig. 8 is a top plan thereof, the tubes being shown in section;

Fig. 9 is a side elevation of a further embodiment of my invention;

Fig. 10 is a plan thereof; and

Fig. 11 is a side elevation of a still further embodiment of the invention.

Referring more particularly to the drawings, it will be seen that I have illustrated a meter, or the like, 10 connected between a supply line 11 and a service line 12, adjacent ends of said pipes 11 and 12 being disposed substantially in alignment and slightly spaced from each other. The meter is provided with opposed pipes or nipples 13 and 14, the nipple 13 being the inlet to the meter, and the nipple 14 being the outlet therefrom. The meter is connected between the pipes 11 and 12, and is supported from said pipes, by the unit now to be described.

Said unit comprises a tube or conduit 15, preferably formed of copper or other substantially non-corroding, relatively flexible metal, it being understood, however, that the tube 15 is sufficiently rigid to provide a suitable support for the meter 10. The tube 15 is curved as at 16 adjacent its end 17; and is curved as at 18 adjacent its end 19. It will be noted that the curves 16 and 18 are so formed that said curved portions define, with the body portion 15, planes which are substantially perpendicular to each other. The end 17 of the tube 15 terminates in an external flange 24, and the end 19 of said tube terminates in an external flange 20.

A second tube 21, similar in all respects to the tube 15, is curved as at 22 adjacent its end 23, and is curved as at 25 adjacent its end 26; the curved portions 22 and 25 defining, with the body portion 21, planes which are substantially perpendicular to each other. The end 23 of the tube 21 terminates in an external flange 24; and the end 26 of said tube terminates in an external flange 27.

A clamp, forming a part of the unit, comprises a plate 28 formed with a groove 29, the opposite ends 30 and 31 of said groove being disposed substantially at right angles to each other. The end 31 of said groove is, in fact, a passage formed through a hub 37 integral with said plate 28; and the outer end of said passage is surrounded by a countersunk recess 32.

Said plate is further formed with a groove 33, the ends 34 and 35 of which are disposed substantially at right angles to each other. The end 35 of said groove 33 is, in fact, a passage formed in a hub 39 integral with said plate 28; and a countersunk recess 36 surrounds the outer end of said passage. The end 30 of the groove 29 is substantially aligned with the end 34 of the groove 33; and the end 31 of the groove 29 is substantially aligned with the end 35 of the groove 33.

The curved portion 18 of the tube 15 is snugly received within the groove 29, and the flange 20 of said tube 15 is seated in the recess 32. Similarly, the curved portion 25 of the tube 21 is snugly received in the groove 33 with its flange 27 seated in the recess 36. The hub 37 is externally threaded as at 38 and the hub 39 is externally threaded as at 40.

A plate 41 cooperates with the plate 28 to clamp the tube ends 19 and 26 rigidly together. Said plate 41 is formed with grooves mating with the grooves 29 and 33 and receiving the portions 18 and 25 of the respective tubes 15 and 21. Incidentally, said plate 41 is formed with a pair of ribs 46 and 47 defining the axes of the channels formed by the mating grooves in the plates 28 and 41.

Said plate 41 is centrally formed with a countersunk recess 48 receiving the head 49 of a rivet 50 which passes through said plates 41 and 28 and is headed over, as at 51, against the outer side of the plate 28.

Each of the hubs 37 and 39 is provided with a combined union and coupling, whereby said hubs may be connected to the pipe ends 11 and 12, respectively. Since these units are identical, only one has been illustrated in detail, and only one will be described. Each unit comprises a single-ended coupling 52 internally threaded as at 53 at one end and provided, adjacent its opposite end, with an external flange 54. At the end adjacent which the flange 54 is formed, the coupling may preferably be provided with a plurality of axially extending concentric ribs 55. An internally threaded union sleeve 56 is slidably mounted upon the coupling 52, said union 56 being formed with an internally projecting flange 57 adapted to engage the flange 54. Said union element is adapted to be threadedly engaged with the threads 38 or 40 of the hub 37 or 39, whereby the coupling element 52 may be drawn into intimate contact with the flange 20 or 27 of the tube 15 or 21. Obviously, the ribs 55 will provide a sealing engagement between the coupling element 52 and the tube flange.

Slidably and rotatably mounted upon the ends 17 and 23 of the tubes 15 and 21 are union sleeves 58. Since these sleeves are identical, only one has been illustrated in detail, and only one will be described. The sleeve 58 is formed with an internally projecting flange 59 adapted to engage the flange 24 of the tube end 17 or 23. Said sleeve 58 is internally threaded for cooperation with the threads 60 of the pipes 13 or 14, whereby the tube ends may be drawn into sealing relation with the meter pipes, washers 61 preferably being interposed between the flanges 24 and the meter pipes.

When a unit of the present invention is first to be installed between a pair of pipes 11 and 12, the union sleeves 56 are retracted from the hubs 37 and 39, thus freeing the coupling elements 52 for rotation with respect to said hubs and with respect to said union elements. The couplings are then turned down upon the pipe ends 11 and 12 (gaskets being inserted, if desired) whereafter the union sleeves 56 may be turned down upon the hubs 37 and 39. The unit is thus securely connected between the pipes 11 and 12, without laterally disturbing said pipes. It will be seen that there is no necessity for flexing the pipes 11 and 12 to perform this operation.

The ends 17 and 23 of the tubes 15 and 21 are spaced apart a distance substantially equal to the distance between the free ends of the pipes 13 and 14. When a meter is to be installed upon the unit, the sleeves 58 are backed away from the flanges 24 of the tube ends 17 and 23, and the meter pipes 13 and 14 are located between said tube ends. The sleeves 58 are then threaded onto the pipes 13 and 14, and the installation of the meter is complete. To remove or replace the meter, it is only necessary to back off the union elements 58. No manual flexing of the tubes 15 and 21 or of the pipes 11 and 12 is necessary, substantially all of the necessary movement being taken care of by the sleeves 58, and the remainder of such movement being taken care of by the fact that the copper tubes 15 and 21 are somewhat resilient and, when the unit is moved, the ends 17 and 23 thereof are spaced apart slightly more than the distance between the ends of the pipes 13 and 14. When the meter is installed, therefore, as the unions 58 are pulled up, the tubes 15 and 21 are slightly flexed inwardly; and when said unions are backed off, as above described, the tubes 15 and 21 will return substantially to their initial positions, thereby releasing the meter.

I am aware of the structure illustrated in the patent to Dish No. 1,201,568 issued October 17, 1916; but I consider my invention to be a distinct improvement upon that structure. The unit of my invention eliminates the necessity for flexing the supply line pipes. It provides, in fact, a brace whereby said pipes are held very rigidly. The unit of my invention further is adapted for connection between horizontally disposed aligned pipe ends, as well as between vertically disposed pipe ends, as illustrated. It will be obvious that, if the illustration of Fig. 1 of the accompanying drawings is considered as an elevation, the pipes 11 and 12 being horizontally disposed, the meter 10 may be rotated through 90°, whereby the face thereof will be presented upwardly.

Still further, according to my invention the necessity for a hinged movement of the tubes 15 and 21 is eliminated. It has been found that, where meter installations stand for a long time without disturbance, a hinge often becomes rusted or corroded, so that movement of the parts about the hinge is rendered almost impossible. No such movements are necessary when a meter is to be removed from an installation according to my invention. It is only necessary to back off the union elements 58 and lift the meter out of its support.

Meters are sometimes installed in small pits, being connected between horizontal pipe ends. In such installations, movement of the unit branches about a substantially centrally located hinge will be prevented by the walls of the pit. The unit of my invention is admirably adapted for use in such installations.

Referring, now, to Figs. 7 and 8, it will be seen that I have illustrated a connector-support comprising a connector bar 65 at the opposite ends of which are preferably integrally formed a pair of elbows 66 and 67, formed with curved channels 68 and 69 therethrough. In the illustrated embodiments, the channels are curved through 90°. The elbow 66 terminates at one end in an externally threaded boss 70, and the elbow 67 terminates at the corresponding end in an externally threaded boss 71, the axes of said bosses 70 and 71 being disposed in alignment, and said bosses facing oppositely. With each of said bosses 70 and 71 is associated a coupling 52 and union sleeve 56, said elements preferably corresponding to the same elements illustrated in, and described in connection with, Figs. 1 to 6, said couplings 52 being adapted to be threaded onto supply and delivery pipe ends 11 and 12.

With the unit above described two conduits 72 and 73 are associated, said conduit preferably being formed of copper or other substantially non-corroding, relatively flexible metal. The conduit 72 is associated with the elbow 66, said conduit being forced into and through said elbow, and having its one end headed over to form a flange similar to the flanges 20 or 27 illustrated in Fig. 4; with which flange the inner end of the coupling 52 cooperates. At its free end, the conduit 72 carries a union sleeve 58. The conduit 73 is similarly associated with the elbow 67, whereby the conduits 72 and 73 form continuous passages between their free ends with which are associated the union sleeves 58 and their flanged ends with which are associated the couplings 52.

The unit illustrated in Figs. 9 and 10 is quite similar to that illustrated in Figs. 7 and 8, except for the fact that the conduit ends are anchored together in a somewhat different manner. The connector unit is indicated generally by the reference numeral 74, and said unit comprises a pair of co-operating elements 75 and 81. The element 75 comprises a bar provided at its one end with a preferably integral head 76 formed in its one surface with a curved groove 77, and carrying at its free end a boss 78 through which extends a passage forming a continuation of the groove 77. At its opposite end, the bar 75 is preferably integrally provided with a head 79 formed with a curved groove 80.

The bar 81 is in all respects identical with the bar 75, said bar 81 carrying at its one end a preferably integral head 82 formed with a curved groove 83 and provided at its free end with a boss 84 formed with a passage therethrough comprising a continuation of the groove 83. At its opposite end, the bar 81 carries a preferably integral head 85 formed with a curved groove 86.

When the bars 75 and 81 are assembled in mating relation, the groove 80 of the head 79 of the bar 75 registers with the groove 83 of the head 82 of the bar 81, forming therewith a channel of which the passage through the boss 84 is a continuation; and the groove 86 in the head 85 of the bar 81 registers with the groove 77 in the head 76 of the bar 75, forming therewith a channel of which the passage through the boss 78 is a continuation. Cooperatively, then, the bars 75 and 81 mate to provide channels similar to the channels 68 and 69 formed in the elbows 66 and 67 of the embodiment illustrated in Figs. 7 and 8.

One curved end of a conduit 87 similar in all respects to the conduit 72 is received in the channel formed by the grooves 77 and 86 and the passage formed in the boss 78; and the corresponding end of a second conduit 88, similar in all respects to the conduit 73, is received in the channel formed by the grooves 80 and 83 and the passage through the boss 84. The bars 75 and 81 are suitably clamped together as, for instance, by the bolts or rivets 89 and 90.

The bosses 78 and 84 carry couplings 52 and unions 56, whereby said bosses may be connected to the pipes 11 and 12, and the free ends of the conduits 87 and 88 carry unions 58, whereby said conduit ends may be connected to any desired fixture.

In Fig. 11 there is illustrated a still further embodiment of my invention, the same comprising a clamping unit indicated generally at 91. The unit 91 comprises two plates 92 (only one of which is shown), the construction being similar to that illustrated in Figs. 1 to 6, and the two plates being clamped together by a rivet 93 passed therethrough. The plate 92 is formed with bosses 94 and 95 through which extend passages constituting continuations of the channels formed by the mating grooves of the two clamping plates.

Two conduits 96 and 97 are associated with the clamping unit 91. Said conduit 96 is oppositely bent as at 98 and 99 adjacent its opposite ends 100 and 101, the formation being such that the axes of the end portions 100 and 101 are substantially parallel; and that the opposite extremities of said conduit lie substantially in a single plane substantially perpendicular to said axes. Similarly, the conduit 97 is oppositely bent as at 102 and 103 adjacent its opposite ends 104 and 105, the formation being such that the axes of the end portions 104 and 105 are substantially parallel; and the opposite extremities of said conduit lie substantially in a single plane substantially perpendicular to said axes. The bosses 94 and 95 are equipped with couplings 52 and unions 56 whereby said bosses may be connected to the pipes 11 and 12, and the free ends 100 and 104 of the conduits 96 and 97, respectively, are provided with unions 58, whereby said free ends may be connected to any desired fixture.

It will be clear that the construction of Fig. 11 may advantageously be used to elevate a meter, previously installed directly in the supply line, to a more accessible position. That is, since the distance between the extremities of the conduit end portions 101 and 105 is substantially identical with the distance between the extremities of the conduit end portions 100 and 104, it is obvious that a meter previously installed directly between the ends of pipes 11 and 12 can be lifted out and readily connected between the conduit ends 100 and 104; and that the conduit ends 101 and 105 can be readily connected between the ends of pipes 11 and 12 without disturbance thereof.

It will be seen that I have provided several very simple, but highly advantageous structures of inexpensive construction which are capable of being used in locations not adapted to the requirements of other units of the same general type; and that I have provided units which materially simplify the operation of installing and removing meters.

I claim as my invention:

1. The combination with a fixture having opposed pipes secured thereto, of a connector-support therefor comprising a pair of conduits, each conduit comprising a body portion formed at one end for communicating association with one of said pipes, and formed at its opposite end with a portion the axis of which is perpendicular to the plane of said body portion, means rigidly securing said last-mentioned conduit ends together, and means for securing said first-mentioned conduit ends to said respective pipes.

2. The combination with a fixture having opposed pipes secured thereto, of a connector-support therefor comprising a pair of conduits, each conduit comprising a body portion formed at one end for communicating association with one of said pipes, and formed at its opposite end with a portion the axis of which is perpendicular to the plane of said body portion, means rigidly securing said last-mentioned conduit ends together, and means adjustable on said conduits for securing said first-mentioned conduit ends to said respective pipes.

3. The combination with a pair of spaced, substantially aligned pipe ends and a fixture having opposed pipes adapted to be connected to said pipe ends, respectively, of a unit for connecting said opposed pipes to said pipe ends, said unit consisting of a pair of conduits, each conduit being formed at its opposite ends with curved portions, the opposite end portions of each conduit lying in substantially perpendicular planes, a union at one end of each of said conduits for connection with one of said fixture pipes, a union at the opposite end of each of said conduits for connection with one of said aligned pipe ends, and a fitting associated with said last-mentioned conduit ends and holding the same rigidly with their free ends in oppositely directed alignment.

4. The combination with a pair of spaced, substantially aligned pipe ends and a fixture having opposed pipes adapted to be connected respectively to said pipe ends, of a unit for connecting said opposed pipes to said pipe ends, said unit consisting of a pair of conduits, means rigidly securing together corresponding ends of said two conduits, said ends being in substantial alignment and projecting away from each other, means for connecting said conduit ends to said pipe ends without laterally disturbing said pipe ends, the opposite ends of said conduits being disposed in substantial alignment and projecting toward each other, and means for connecting said last-mentioned conduit ends to said opposed pipes substantially without disturbing the relation of said conduits to each other.

5. A fitting of the character described comprising a two-piece clamp formed to provide a pair of curved channels, each end of one of said channels being aligned with the corresponding end of the other of said channels, a pair of conduits, each having one end rigidly secured in one of said channels, respectively, the opposite ends of said respective conduits facing each other in substantial alignment, an internally threaded sleeve slidably mounted on said last-mentioned end of each of said conduits, and means preventing removal of said sleeves over said last-mentioned conduit ends.

6. A fitting of the character described comprising a two-piece clamp formed to provide a pair of curved channels, each end of one of said channels being aligned with the corresponding end of the other of said channels, a pair of conduits, each having one end rigidly secured in one of said channels, respectively, the opposite ends of said respective conduits facing each other in substantial alignment, an internally threaded sleeve slidably mounted on said last-mentioned end of each of said conduits, means preventing removal of said sleeves over said last-mentioned conduit ends, a single-ended coupling having an external shoulder adjacent its unthreaded end, an internally threaded sleeve engaging said shoulder and threaded on said clamp with said coupling in registry with the clamped end of one of said conduits, and a second single-ended coupling having an external shoulder adjacent its unthreaded end, a second internally threaded sleeve engaging said last-mentioned shoulder and threaded on said clamp with said second coupling in registry with the clamped end of the other of said conduits.

7. A fitting of the character described comprising a two-piece clamp formed to provide a pair of curved channels, each end of one of said channels being aligned with the corresponding end of the other of said channels, a pair of copper tubes, each tube being reversely bent at its opposite ends, and said bends defining substantially perpendicular planes, one end of each conduit being rigidly clamped in one of said channels, respectively, unions at the free ends of said tubes, a pair of couplings, and a pair of unions securing said couplings to said clamps in registry with the clamped ends of said tubes, respectively.

8. A fitting of the character described comprising a pair of clamp members, each consisting of a bar, and each bar being provided at its opposite ends with heads, the head at one end of each bar being formed with a curved groove in one surface, and the head at the other end of each bar being formed with a curved groove in its corresponding surface and with an externally threaded boss formed with a passage therethrough comprising a continuation of said groove, and means for clamping said bars together with the first-mentioned head of each of said bars registering with the second-mentioned head of the other bar, whereby said grooves mate to form curved channels terminating in said passages.

9. A fitting of the character described comprising a pair of clamp members, each consisting of a bar, and each bar being provided at its opposite ends with heads, the head at one end of each bar being formed with a curved groove in one surface, and the head at the other end of each bar being formed with a curved groove in its corresponding surface and with an externally threaded boss formed with a passage therethrough comprising a continuation of said groove, means for clamping said bars together with the first-mentioned head of each of said bars registering with the second-mentioned head of the other bar, whereby said grooves mate to form curved channels terminating in said passages, and a pair of conduits each having a curved end received in one of said channels.

10. A fitting of the character described comprising a pair of clamp members, each consisting of a bar, and each bar being provided at its opposite ends with heads, the head at one end of each bar being formed with a curved groove in one surface, and the head at the other end of each bar being formed with a curved groove in its corresponding surface and with an externally threaded boss formed with a passage therethrough comprising a continuation of said groove, means for clamping said bars together with the first-mentioned head of each of said bars registering with the second-mentioned head of the other bar, whereby said grooves mate to form curved channels terminating in said passages, and a pair of conduits each having a curved end received in one of said channels and extending completely therethrough.

11. A fitting of the class described comprising a connector provided at its opposite ends with heads having curved passages therethrough, and a pair of continuous conduits, each of said conduits being provided with a curved end, and said curved conduit ends being received in said passages, respectively, and extending completely therethrough.

12. A fitting of the character described, comprising a pair of curved conduits, and a holder connected to said conduits, said conduits being so shaped and positioned by the holder that two ends thereof will be in substantial alignment and spaced from each other, said ends being so formed as to facilitate connection with an interposed instrument to be supported thereby, and the holder formed at each adjacent conduit end for detachable connection with other conduits.

13. A fitting comprising two curved metallic conduits, one end of each conduit in line with and facing the corresponding end of the other conduit and formed for detachable connection with an interposable instrument, and a holder engaging and rigidly connecting the opposite ends of said conduits and formed for detachable connection with other conduits.

14. A resetter fitting for connecting a meter into a line, said fitting comprising a pair of conduits, each curved adjacent its opposite ends, whereby the axes of the two end portions of each conduit lie in separate parallel planes, means rigidly connecting said conduits against relative movement, each end portion of each conduit being substantially aligned with the corresponding end portion of the other conduit, and the distances between the two pairs of aligned conduit ends being substantially equal to each other and to the distance between spud ends of a standard meter, and means cooperating with said first named means for coupling said conduits into a line.

15. A fitting of the character described comprising a pair of conduits and means rigidly engaging one end of each of said conduits to hold said conduit ends with their axes in alignment with each other and against relative movement, and providing means for coupling said conduit ends into a line, the other ends of said conduits being axially aligned with each other and spaced from said first-named ends, the distance between said last-named conduit ends being substantially equal to the distance between said first-named conduit ends.

JOHN L. FORD.